(12) United States Patent
Pichon

(10) Patent No.: US 11,629,516 B2
(45) Date of Patent: Apr. 18, 2023

(54) SWIMMING POOL CLEANING SYSTEM WITH IMAGE CAPTURE DEVICE

(71) Applicant: ZODIAC POOL CARE EUROPE, Belberaud (FR)

(72) Inventor: Philippe Pichon, Villeneuve de Riviere (FR)

(73) Assignee: ZODIAC POOL CARE EUROPE, Belberaud (FR)

( * ) Notice: Subject to any disclaimer, the term of this patent is extended or adjusted under 35 U.S.C. 154(b) by 0 days.

(21) Appl. No.: 17/693,244

(22) Filed: Mar. 11, 2022

(65) Prior Publication Data

US 2022/0195746 A1    Jun. 23, 2022

Related U.S. Application Data

(63) Continuation of application No. 15/764,471, filed as application No. PCT/FR2016/052456 on Sep. 28, 2016, now Pat. No. 11,306,500.

(30) Foreign Application Priority Data

Oct. 1, 2015 (FR) ...................................... 1559339

(51) Int. Cl.
| | |
|---|---|
| *E04H 4/16* | (2006.01) |
| *H04N 5/225* | (2006.01) |
| *G05D 1/02* | (2020.01) |
| *H04N 5/247* | (2006.01) |

(52) U.S. Cl.
CPC ......... *E04H 4/1654* (2013.01); *G05D 1/0206* (2013.01); *H04N 5/225* (2013.01); *H04N 5/247* (2013.01); *G05D 2201/0215* (2013.01)

(58) Field of Classification Search
CPC .... E04H 4/1654; H04N 5/247; G05D 1/0206; G05D 2201/0215
See application file for complete search history.

(56) References Cited

U.S. PATENT DOCUMENTS

| | | |
|---|---|---|
| 5,205,174 A | 4/1993 | Silverman et al. |
| 5,561,883 A | 10/1996 | Landry et al. |
| 6,980,228 B1 | 12/2005 | Harper et al. |
| 7,409,853 B2 | 8/2008 | Biberger et al. |
| 8,394,266 B2 | 3/2013 | Pichon et al. |
| 9,779,842 B2 | 10/2017 | Strohmayer et al. |
| 9,995,050 B2 | 6/2018 | Durvasula et al. |
| 10,107,000 B2 | 10/2018 | Barcelos et al. |
| 2001/0032809 A1 | 10/2001 | Henkin et al. |

(Continued)

FOREIGN PATENT DOCUMENTS

| | | |
|---|---|---|
| EP | 2492403 | 8/2012 |
| EP | 2607573 | 6/2013 |

(Continued)

OTHER PUBLICATIONS

U.S. Appl. No. 15/764,471, Advisory Action dated Oct. 21, 2021, 3 pages.

(Continued)

*Primary Examiner* — Ramsey Refai
(74) *Attorney, Agent, or Firm* — Kilpatrick Townsend & Stockton LLP

(57) ABSTRACT

The invention relates to a swimming pool cleaning system comprising a cleaning apparatus to be immersed in the pool, the system further comprising at least one moving image acquisition means secured to a float via a flexible tie.

17 Claims, 2 Drawing Sheets

(56) References Cited

U.S. PATENT DOCUMENTS

| | | |
|---|---|---|
| 2004/0208499 A1 | 10/2004 | Grober |
| 2012/0315813 A1 | 12/2012 | Rossini |
| 2014/0015959 A1 | 1/2014 | Durvasula et al. |
| 2014/0263087 A1 | 9/2014 | Renaud et al. |
| 2016/0026071 A1 | 1/2016 | Kanai et al. |
| 2016/0148711 A1 | 5/2016 | Strohmayer et al. |
| 2016/0223452 A1 | 8/2016 | Milosevic et al. |

FOREIGN PATENT DOCUMENTS

| | | |
|---|---|---|
| FR | 2781243 | 1/2000 |
| FR | 2929311 | 10/2009 |
| JP | 1134979 | 2/1999 |
| WO | 2012023676 | 2/2012 |

OTHER PUBLICATIONS

U.S. Appl. No. 15/764,471, Final Office Action dated Aug. 12, 2021, 6 pages.
U.S. Appl. No. 15/764,471, Final Office Action dated Nov. 7, 2019, 7 Pages.
U.S. Appl. No. 15/764,471, Non-Final Office Action dated May 3, 2021, 6 pages.
U.S. Appl. No. 15/764,471, Non-Final Office Action dated Sep. 12, 2019, 9 pages.
U.S. Appl. No. 15/764,471, Notice of Allowance dated Jan. 20, 2022, 5 pages.
Australia Application No. 2016329776, First Examination Report dated Jul. 29, 2020, 10 pages.
Australia Application No. 2016329776, Notice of Acceptance dated Mar. 17, 2021, 3 pages.
European Application No. 16785233.4, Notice of Decision to Grant dated May 31, 2019, 2 pages.
French Application No. 1559339, Notice of Decision to Grant dated Sep. 4, 2017, 1 page.
French Application No. 1559339, Search Report dated Jun. 3, 2016, 7 pages.
International Application No. PCT/FR2016/052456, International Preliminary Report on Patentability dated Apr. 3, 2018, 7 pages.
International Application No. PCT/FR2016/052456, International Search Report and Written Opinion dated Dec. 21, 2016, 12 pages.
South African Application No. 2018/02659, Notice of Allowance dated Sep. 2, 2019, 1 page.

SWIMMING POOL CLEANING SYSTEM WITH IMAGE CAPTURE DEVICE

CROSS-REFERENCE TO RELATED APPLICATIONS

This application is a continuation of U.S. application Ser. No. 15/764,471 ("the '471 application"), filed Mar. 29, 2018, and entitled SWIMMING POOL CLEANING SYSTEMS WITH IMAGE CAPTURE DEVICE, which is a national phase entry under 35 USC § 371 of International Application PCT/FR2016/052456 ("the '456 application"), filed Sep. 28, 2016, and entitled SWIMMING POOL CLEANING SYSTEM WITH IMAGE CAPTURE DEVICE, which claims priority to and benefits of French Patent Application No. 1559339 ("the '339 application"), filed on Oct. 1, 2015, and entitled SWIMMING POOL CLEANING SYSTEM WITH IMAGE CAPTURE DEVICE. The '456 application and the '339 application are hereby incorporated in their entireties by this reference.

This invention comes under the field of swimming pools equipment. It concerns more specifically a robot type autonomous system for swimming pool cleaning, associated with power supply and control elements.

PREAMBLE AND PRIOR ART

The invention concerns a device for cleaning a surface submerged in a liquid, such as a surface formed by the walls of a basin, particularly a swimming pool. It concerns more specifically of a mobile swimming pool cleaning robot. Such a cleaning robot performs said cleaning by going all over the bottom and the walls of the swimming pool basin, brushing these walls, and vacuuming debris towards a filter. Debris refers to all particles present in the basin, such as pieces of leaves, microalgae, etc., these debris being normally deposited on the bottom of the basin or adhered to its lateral walls.

More frequently, the robot is powered by an electric cord connecting the robot to an external control and power supply unit.

We know, for example, in this field, patent FR 2 929 311 of the applicant, that concerns a submerged surface cleaning device with pump pressure regulation. Such devices include a body, driving members of said body on the submerged surface, a filtration chamber within the body and including a liquid inlet, a liquid outlet, a liquid circulation hydraulic circuit between inlet and outlet through a filtering device. In this patent, the filtering device is removable for allowing emptying the leaves and other debris without having to return the cleaning device.

It is known, as well in the same field, the patent application EP 2 607 573 that concerns a swimming pool cleaning device with pump flow regulation, including a sensor configured for detecting foreign objects in the swimming pool, the pump being activated at different power levels, depending on the presence or absence of detection by the sensor of a foreign object in the swimming pool.

Another example in this field is the patent application US 2014/015959 A1 that concerns a swimming pool cleaning system using a device for cleaning a submerged surface and cameras, situated outside the basin and configured for capturing images of the swimming pool and of the submerged surface cleaning device.

Finally, we know as well patent U.S. Pat. No. 5,561,883 that concerns a containers cleaning device used for storage in petrochemical factories or refineries. Such a device includes especially an on-board camera and an on-board light source allowing the device user to control remotely the device movements.

One of the problems of all these robots is the difficulty to control their movements in a manner that maximizes the cleaned area depending on time.

The purpose of the invention is to remedy especially this inconvenience.

SUMMARY OF THE INVENTION

The invention concerns, first of all, a swimming pool cleaning system including a cleaning device intended to be submerged in the swimming pool.

The system also comprises an image acquisition means secured to a float via a flexible tie attached to the submerged cleaning device. The image acquisition means includes advantageously at least one video camera. It can include two cameras oriented in different directions.

In one alternative embodiment, the image acquisition means includes a means for measuring local luminance in a targeted area and, for example, around the cleaning device. This corresponds to a much "degraded" image acquisition compared to a video camera image, but however it is sufficient for detecting areas more or less dark on the bottom of the basin to be cleaned.

We call "swimming pool cleaning device" a device for the cleaning of a submerged surface, namely typically a device mobile within or on the bottom of a swimming pool basin, and adapted to perform the filtering of debris deposited both on the bottom and a wall. Such a device is commonly known as a swimming pool cleaning robot, when it comprises means for automated management of the movements on the bottom and on the walls of the swimming pool in order to cover the entire surface to be cleaned.

We call here, by language abuse, "liquid" the mix of water and debris in suspension in the swimming pool or in the fluid circulation circuit within the cleaning device.

In one particular embodiment, the swimming pool cleaning system includes means for transferring images acquired by the image acquisition means to an apparatus for controlling the cleaning device.

It includes advantageously means to modify the trajectory of the cleaning device depending on the acquired images.

In particular embodiments, at least one part of the float is located on the surface of the swimming pool water.

The invention also concerns a method for controlling the swimming pool cleaning device for a cleaning system as exposed, the method including a step wherein an area still not cleaned on the bottom of the basin is detected and a step of modifying the trajectory of the cleaning device for covering and cleaning this area.

The invention also concerns a method for controlling a swimming pool cleaning device for a cleaning system as exposed, the method including a step wherein the basin geometry around the device is detected and a step of modifying the trajectory in response to the observed geometry (slope, wall or particular obstacle).

The invention also concerns a submerged surface cleaning system characterized in combination with all or part of the features mentioned above or below.

DESCRIPTION OF THE FIGURES

The features and the advantages of the invention will be better understood thanks to the following description, which sets out the features of the invention via a non-limiting application example.

The description is supported by the attached figures, in which.

DETAILED DESCRIPTION OF AN EMBODIMENT OF THE INVENTION

The invention finds its place within a swimming pool technical environment, for example a family type semi-subterranean swimming pool.

A submerged surface cleaning system includes, in the present exemplary embodiment, a cleaning device 10, named hereinafter swimming pool cleaning robot, and a power supply and control unit of said swimming pool cleaning robot (not represented in the figures). In a variant, this power supply and control unit can be integrated in the cleaning device. In another variant, this power supply and control unit can be integrated in the float bearing images acquisition means.

Figure 1:
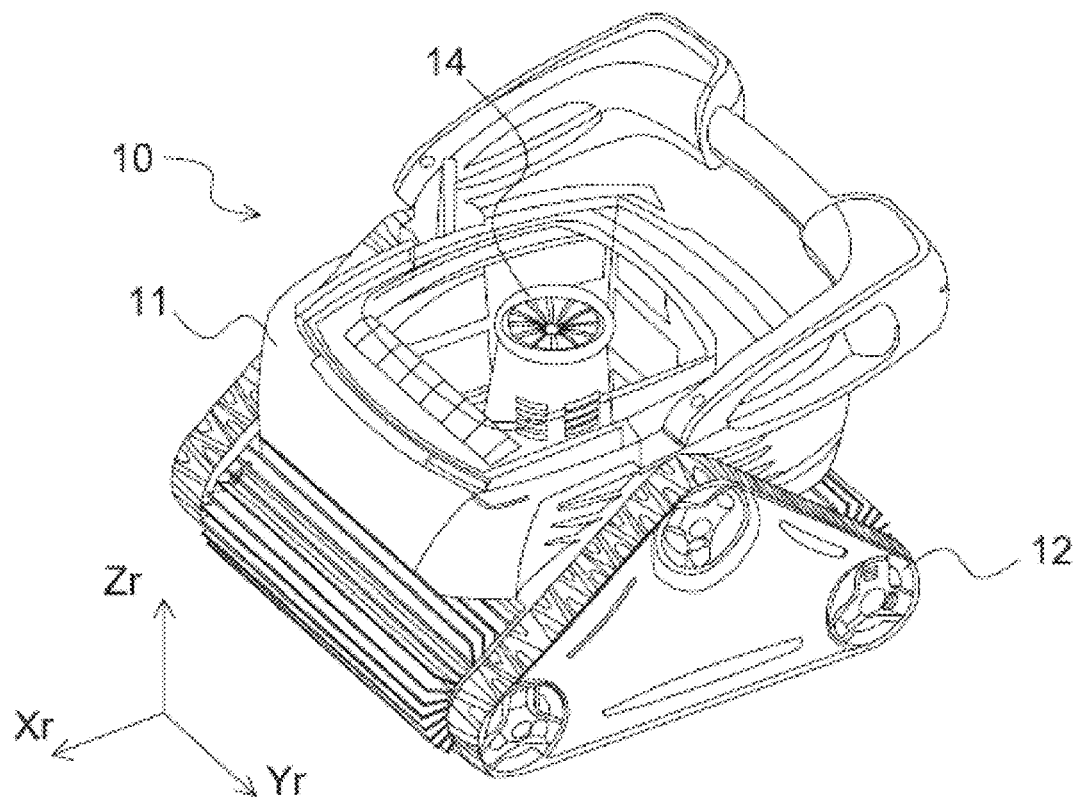
FIG. 1 shows a perspective view of a swimming pool cleaning device implementing a filtering system as exposed.
Figure 2:
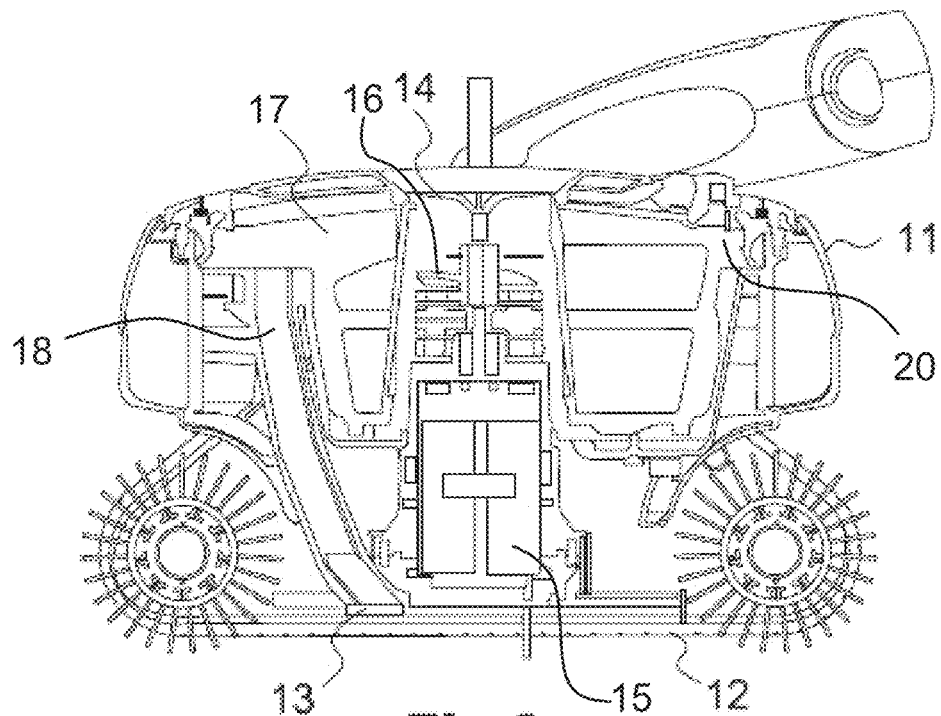
FIG. 2 shows a sectional view of the same device according to a longitudinal vertical plan.

The cleaning device 10 is represented according to an embodiment given here as example in FIGS. 1 and 2. In these figures, the device type is equipped with water expulsion inclined towards the rear of the device relative to the plane on which the robot rolls.

The cleaning device 10 includes a body 11 and driving and guiding members 12 of the body 11 on a submerged surface. In this example, the driving and guiding members 12 consist in wheels disposed laterally with respect to the body (see FIG. 1).

The driving and guiding members define a guiding plane on a submerged surface by their points of contact with said submerged surface. Said guiding plane is generally substantially tangential to the submerged surface at the location of the device. Said guiding plane is for example substantially horizontal when the cleaning device 10 moves over a submerged surface constituting a swimming pool bottom.

Throughout the text the concepts "high" and "low" are defined along a straight line segment perpendicular to said guiding plane, a "low" element being closer to the guiding plane than a high element.

The swimming pool cleaning device 10 further includes a motor driving said driving and guiding members, said motor being supplied with energy by the command and control unit via a waterproof flexible cable in the present example. In other embodiments, the cleaning device is energy self-sufficient.

The swimming pool cleaning device 10 includes at least one liquid inlet 13 and one liquid outlet 14. The liquid inlet 13 is situated at the base of the body (in other words on its underside), i.e. immediately faces an submerged surface over which the device moves in order to be able to vacuum the debris accumulated on said submerged surface.

The liquid outlet 14 is situated here on the lid at the rear of the cleaning device 10. In the present example, the liquid outlet is in a direction oriented toward the rear of the cleaning device 10. However, this arrangement is not restrictive, and a water outlet substantially perpendicular to the guiding plane, i.e. vertical if the cleaning device is resting on the bottom of the swimming pool, can also be envisaged.

The cleaning device 10 includes a hydraulic circuit connecting the liquid inlet 13 to the liquid outlet 14. The hydraulic circuit is adapted for ensuring a liquid circulation from the liquid inlet 13 to the liquid outlet 14. To this end, the cleaning device 10 includes a circulation pump including an electric motor 15 and an impeller 16 (see FIG. 2), said electric motor 15 driving the impeller 16 in rotation, said impeller being disposed in the hydraulic circuit.

The cleaning device 10 includes a filtration chamber 17 disposed in the hydraulic circuit between the liquid inlet 13 and the liquid outlet 14. The filtration chamber is in particular fed with liquid via at least one upstream channel 18 connecting the liquid inlet 13 to the filtration chamber 17.

The filtration chamber 17 contains a filter basket 20. This filter basket 20 is advantageously although not necessarily removable.

Figure 3:
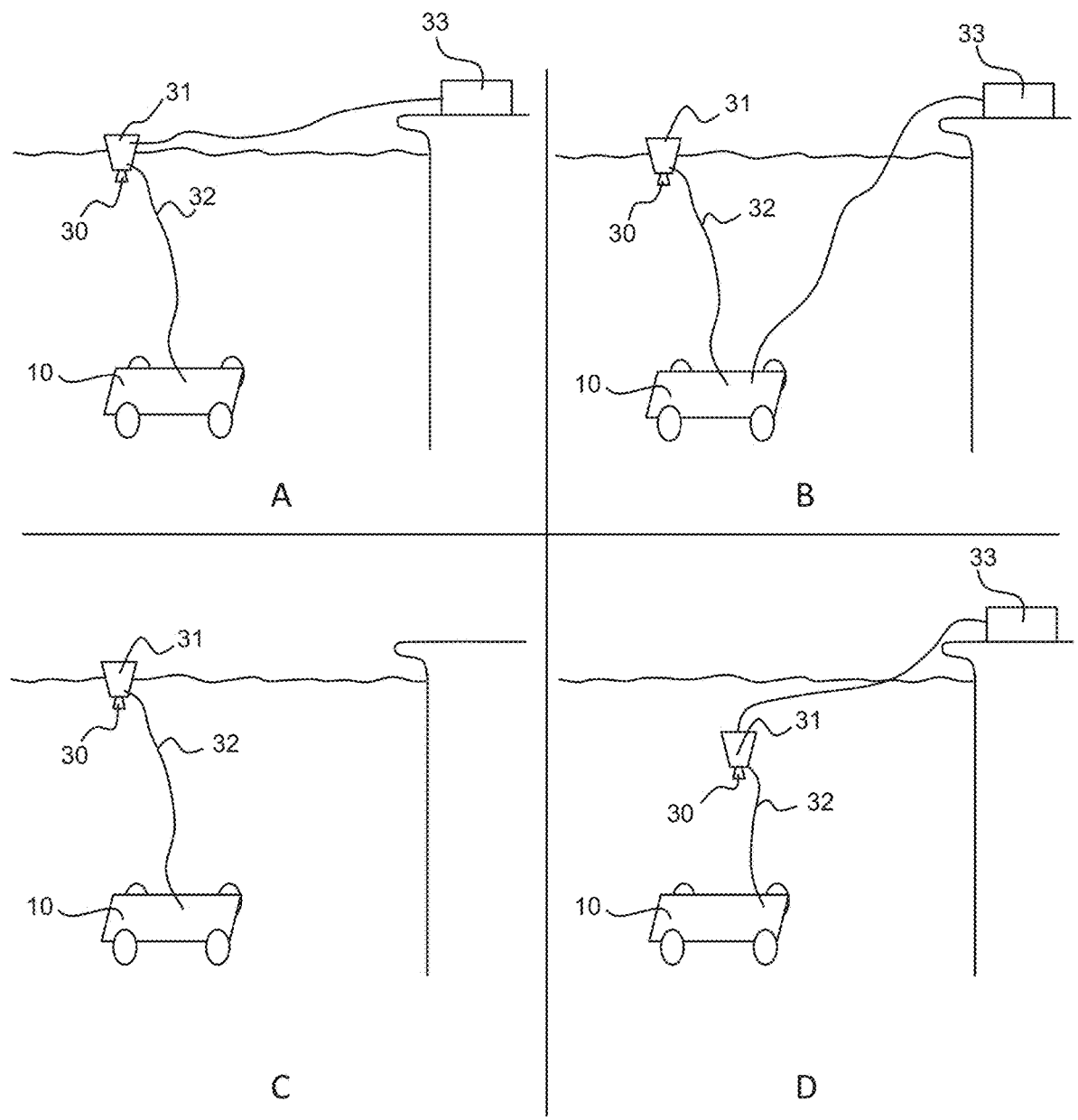
FIG. 3 shows a view of the main elements of the swimming pool cleaning system, including the cleaning device and a camera attached to the float, according to four different embodiments (A, B, C, D).

In the embodiment described here as example, the cleaning device 10 (in other terms the swimming pool robot) is equipped with a camera 30 (see FIG. 3).

In the present example of embodiment, the camera 30 is installed on a float 31, which is pulled by the cleaning device 10 via a cable 32. This cable 32 can coincide with a power supply and control cable connecting the cleaning device 10 to a power supply and control unit 33 of the cleaning device 10, especially when this unit is composed of a system placed at the exterior and in the vicinity of the swimming pool.

This camera 30 is, in this case, a video camera type, for example similar to webcams integrated on personal computers. The camera 30 is thus advantageously of small sizes (less than a few tens of cm$^3$) and light weight (less than a few tens of grams). However, the camera 30 can come in bigger sizes, according to the specifications of said camera. We can have as well a group of two or several cameras (not shown in the figures) oriented, for example, in different directions. However, in the embodiment described here, only one camera is used as, being situated above the cleaning device 10, it can detect alone the dirt level and the geometry of the swimming pool around the cleaning device 10.

The camera 30 is here powered by cable 32 that connects it to the cleaning device 10. It can be alternatively energy self-sufficient, for example, if it includes a power battery (not illustrated in the figures), with an energy autonomy adapted to its specifications. It can be as well powered by a small photovoltaic panel attached to the upper part of the float 31.

FIGS. 3 A, B, C and D illustrate respectively four different embodiments of the present invention. FIG. 3A illustrates an embodiment wherein the electric power supply of the cleaning device 10 is made through the float 31, enabling the camera 30 to be powered and images to be directly sent to the power supply unit 33 so that the latter can transfer them to equipments via the Internet.

FIG. 3B illustrates an embodiment wherein the power supply of the cleaning device is performed by a power supply unit 33 separated from the connection with the float 31. This configuration can be planned in retrofit, for example.

FIG. 3C illustrates an embodiment wherein the float 31 comprises a battery and/or a solar panel (not represented in the figure) serving to power supplying the camera 30 and the cleaning device 10.

FIG. 3D illustrates an embodiment identical to that illustrated in FIG. 3A, wherein the float 31 is not on the surface but is located at a fixed distance from the cleaning device 10.

In the variants indicated here as example, which are not exhaustive, the power supply unit 33 supplies the cleaning device 10. The unit 33 controls only the start of the cleaning cycle and the user HMI. The cleaning device 10 control, that manages the pump and traction motors depending on the movement algorithm and the information given by integrated sensors, such as the gyroscope or the accelerometer, is situated in the cleaning device 10.

The idea is to have an image processing close to the camera (in the float), the "simple" information generated by the image processing being further used by the control circuit integrated in the robot for adapting its movement.

The camera 30 is here oriented towards the cleaning device 10. It is, in this respect, oriented according to a predetermined angle, potentially adjustable, in comparison with the normal floatation direction of the float 31. As such, the visual field of the camera 30 covers both the cleaning device 10 and its vicinity, and especially the vertical walls of the basin when the device comes closer to them. In this example of embodiment, the flexible connection between the cleaning device 10 and the float makes any orientation determined in relation to one another difficult. The system thus includes means for recognizing, regardless of the float orientation, the orientation and the direction of movement of the cleaning device 10, with the help of markers placed on the body of the latter. In one example of embodiment, the system includes means for detecting, on the images supplied by the camera 30, the orientation and the direction of movement of the cleaning device 10.

Likewise, the camera is able to notice the luminance differences in its visual field and thus especially to notice the dirtiest areas of the bottom of the basin.

The camera 30 transfers its images to the power supply and control unit 33 or to any other apparatus for controlling the cleaning device. It can, for example, send its images to a Smartphone equipped with means for remote controlling the cleaning device 10.

In this example of embodiment, the control unit 33 includes means for modifying the trajectory of the cleaning device 10 depending on the images received by the camera 30.

Operating Mode

In the present example of implementation, when operating the robot, the video camera 30 is started and the video data are sent to the power supply and control unit.

The camera 30 thus allows optimizing the movement of the cleaning device 10 for limiting its functioning duration.

The control method can especially include a step wherein an area not yet cleaned on the bottom of the basin is detected, for example, through the detection of a locally darker color of the bottom. In a next step, the cleaning device 10 is controlled towards this dirty area.

The control method can as well include a step wherein we establish the geometry of the basin surface situated around the cleaning device 10 (slope, wall, point obstacle. etc.). In a next step, the cleaning device 10 adapts its movement depending on the geometry of the basin surface in the vicinity of the robot.

Advantages

The camera 30 is here independent of the body 11 of the cleaning device 10 (meaning it is not attached to the robot body), to which it is connected only by a cable 32. It is not as well fixed in relation to the basin, which allows it to follow the movements of the cleaning device 10 regardless of the position and the behavior of the latter in relation to the basin.

The advantages are:

complete vision of the environment around the cleaning device 10 (wall, slopes, debris) and not only for the front part of the device, better description of the environment/better image accuracy as the viewing angle is more direct (the bottom of the swimming pool faces the camera 30).

no need to create a waterproof volume on the cleaning device 10 which affects the device balance (reduced manufacturing cost) and possibility to equip a posteriori a preexistent robot.

the float 31 can as well integrate a battery or a solar panel.

The camera 30 permits to optimize the movement of the cleaning device 10 for covering the area to be cleaned as efficiently as possible, and thus limit the functioning duration of the cleaning device 10, which reduces its wear and tear and maximizes its life cycle. Moreover, the duration of the presence of the cleaning device 10 in the basin is reduced, which increases the availability duration of the later for swimmers.

The invention claimed is:

1. A system for cleaning a swimming pool, comprising:
   a. a cleaning device comprising:
      i. a body defining an inlet and an outlet;
      iii. a motor driving the cleaning device; and
   b. a float configured to float in the swimming pool;
   c. a camera secured to the float;
   d. a flexible tie connecting the cleaning device to at least one of the camera and the float so that, as the body moves on a submerged surface, the body tows the camera and the float;
   e. means for detecting an orientation and direction of movement of the cleaning device moving on the submerged surface based on images supplied by the camera; and
   f. means for electronically controlling the motor of the cleaning device for controlling movement of the cleaning device based on the images supplied by the camera.

2. The system of claim 1, wherein the cleaning device further comprises: one or more motive elements for moving the body on a submerged surface in the swimming pool; and a filter basket positioned in a flow path between the inlet and the outlet of the body.

3. The system of claim 1, wherein the body of the cleaning device further comprises a plurality of markers to assist with detecting the orientation and the direction of movement of the cleaning device.

4. The system of claim 1, wherein the camera is secured to the float at an adjustable angle.

5. The system of claim 1, wherein the flexible tie connects the cleaning device to the at least one camera and the float such that an orientation of the float relative to the cleaning device is adjustable in at least two directions.

6. The system of claim 1, wherein the means for electronically controlling movement of the cleaning device comprise means for controlling motive elements or the motor of the cleaning device based on the images supplied by the camera.

7. The system of claim 1, wherein the float is configured to remain at a waterline of the swimming pool.

8. A system for cleaning a swimming pool, comprising:
   a. a cleaning device comprising:
      i. a body defining an inlet and an outlet;
      ii. one or more motive elements for moving the body on a submerged surface in the swimming pool; and
      iii. a motor;
   b. a float configured to remain at a waterline of the swimming pool;
   c. a camera secured to the float;
   d. a flexible tie connecting the cleaning device to at least one of the camera and the float so that, as the body moves on the submerged surface, the body tows the camera and the float at the waterline;
e. means for determining an orientation and direction of movement of the cleaning device moving on the submerged surface based on images supplied by the camera;
f. means for electronically controlling movement of the cleaning device based on the determined orientation and direction of movement of the cleaning device.

9. The system of claim 8, wherein the cleaning device further comprises a filter basket positioned in a flow path between the inlet and the outlet of the body.

10. The system of claim 8, wherein the cleaning device further comprises an orientation calibration feature on the body of the cleaning device, and wherein the means for determining the orientation and direction of movement of the cleaning device moving on the submerged surface determine the orientation and direction and movement based on a detection of the orientation calibration feature by the camera.

11. The system of claim 8, wherein the flexible tie connects the cleaning device to the at least one camera and the float such that an orientation of the float relative to the cleaning device is adjustable in at least two directions.

12. The system of claim 8, wherein the means for electronically controlling movement of the cleaning device comprise means for controlling at least one of the one or more motive elements or the motor of the cleaning device based on the images supplied by the camera.

13. A system for cleaning a swimming pool, comprising:
a. a cleaning device comprising:
i. a body defining an inlet and an outlet;
ii. one or more motive elements for moving the body on a submerged surface in the swimming pool;
iii. a motor; and
iv. a filter basket positioned in a flow path between the inlet and the outlet of the body;
b. a float configured to float in the swimming pool;
c. a camera secured to the float;
d. a flexible tie connecting the cleaning device to at least one of the camera and the float so that, as the body moves on the submerged surface, the body tows the camera and the float, and the float is selectively submergible below a waterline;
e. means for determining, utilizing images supplied by the camera, an orientation and direction of movement of the cleaning device moving on the submerged surface; and
f. means for electronically controlling movement of the cleaning device based on the determined orientation and direction of movement of the cleaning device.

14. The system of claim 13, wherein the camera is secured to the float and with an orientation angle relative to the float, and wherein the camera is adjustable relative to the float such that the orientation angle is adjustable.

15. The system of claim 13, wherein the flexible tie connects the cleaning device to the at least one camera and the float such that an orientation of the float relative to the cleaning device is adjustable in at least two directions.

16. The system of claim 13, wherein the means for electronically controlling movement of the cleaning device comprise means for controlling at least one of the one or more motive elements or the motor of the cleaning device based on the images supplied by the camera.

17. The system of claim 13, further comprising an orientation calibration feature on the body of the cleaning device, and wherein the means for determining the orientation and direction of movement of the cleaning device moving on the submerged surface comprise means for determining based on a detection of the orientation calibration feature by the camera.

\* \* \* \* \*